United States Patent
Morehouse (12)

(10) Patent No.: US 6,615,123 B2
(45) Date of Patent: *Sep. 2, 2003

(54) PERSONALITY MODULE FOR CONFIGURING A VEHICLE

(75) Inventor: Charles C. Morehouse, Cupertino, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/726,324

(22) Filed: Dec. 1, 2000

(65) Prior Publication Data

US 2002/0069002 A1 Jun. 6, 2002

(51) Int. Cl.⁷ .............................................. G06F 17/00
(52) U.S. Cl. ........................ 701/49; 701/35; 340/426; 318/56.7
(58) Field of Search .................. 701/49, 35, 36; 318/567, 568.1; 340/426

(56) References Cited

U.S. PATENT DOCUMENTS

| | | | | |
|---|---|---|---|---|
| 4,401,928 A | | 8/1983 | Kamijo et al. ............. 318/466 |
| 4,451,887 A | * | 5/1984 | Harada et al. ........... 296/65.16 |
| 4,467,252 A | | 8/1984 | Takeda et al. .............. 318/603 |
| 4,689,537 A | | 8/1987 | Mizuta et al. ............. 318/568 |
| 4,698,571 A | | 10/1987 | Mizuta et al. .............. 318/568 |
| 4,853,687 A | * | 8/1989 | Isomura et al. ............. 318/466 |
| 5,008,603 A | * | 4/1991 | Nakayama et al. ........ 307/10.2 |
| 5,124,920 A | * | 6/1992 | Tamada et al. .......... 235/382.5 |
| 5,812,399 A | * | 9/1998 | Judic et al. ............... 296/65.01 |
| 5,859,593 A | * | 1/1999 | Takemura et al. ......... 307/10.1 |
| 5,903,122 A | * | 5/1999 | Mesnage et al. ............. 318/469 |
| 6,028,537 A | * | 2/2000 | Suman et al. ............. 340/426 |
| 6,122,580 A | | 9/2000 | Autermann .................. 701/49 |
| 6,198,996 B1 | * | 3/2001 | Berstis ........................ 701/36 |
| 6,230,084 B1 | * | 5/2001 | Kijima et al. ............... 307/10.4 |
| 6,330,497 B1 | * | 12/2001 | Obradovich et al. ........... 345/7 |

FOREIGN PATENT DOCUMENTS

| | | |
|---|---|---|
| DE | 3308803 | 9/1984 |
| DE | 3817495 | 11/1989 |
| DE | 4238301 | 5/1994 |
| DE | 4409046 | 9/1995 |

* cited by examiner

*Primary Examiner*—Tan Q. Nguyen

(57) ABSTRACT

A personality module for providing information concerning desired settings for configuring environmental features of a vehicle. A computer-readable medium such as a memory card contains the module and specifies an identification of a user and information for use in automatically establishing settings for the vehicle and specific to the user. The medium further specifies parameters related to the information for use in generating control signals to automatically configure the vehicle according to the settings.

20 Claims, 6 Drawing Sheets

PERSONALITY MODULE FOR CONFIGURING A VEHICLE

FIELD OF THE INVENTION

The present invention relates to a memory for storing a personality module for use in configuring a vehicle for a particular user.

BACKGROUND OF THE INVENTION

Certain automobiles contain systems that permit a user to configure the automobile. For example, a user may adjust a seat position and then save that seat position according to a preset position. Other users may also store their own preset seat configuration in a system resident on the automobile. Therefore, when one of the users uses the automobile, the seat may be automatically adjusted to the user's desired seat position through entry of a code. With this type of system, the user positions the seat in order to store that particular seat position, then indicates the desire to store the settings in the on-board system. Accordingly, a need exists for an improved system for configuring environmental features of an automobile for a particular user, and allowing the user to move from vehicle to vehicle with the personal configuration available for setting up any vehicle.

SUMMARY OF THE INVENTION

A personality module consistent with the present invention provides information concerning desired settings for configuring a vehicle. It includes a computer-readable medium specifying an identification of a user and information for use in automatically establishing settings for the vehicle and specific to the user. The medium further specifies parameters related to the information for use in generating control signals to automatically configure the vehicle according to the settings.

A method consistent with the present invention provides information concerning desired settings for a vehicle. The method includes specifying on a computer-readable medium an identification of a user and information for use in automatically establishing settings for the vehicle and specific to the user. Parameters are specified on the medium related to the information and for use in generating control signals to automatically configure the vehicle according to the settings.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
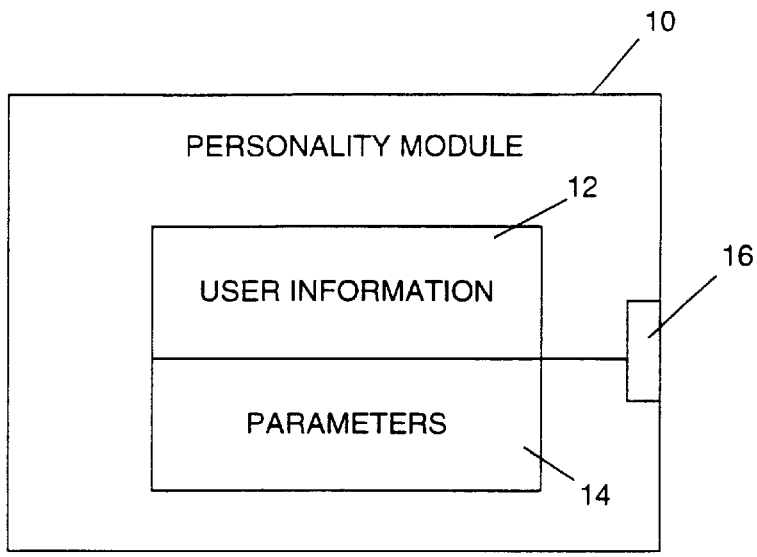
FIG. 1 is a diagram of an exemplary personality module for use in configuring a vehicle.

FIG. 1 is a diagram of an exemplary personality module 10. Personality module 10 may include memory stored within, for example, a credit card size plastic card, or other storage card compatible with interchange between systems for programming and interpreting the data on the storage medium. Personality module 10 can store user information 12 and associated parameters 14 for use in configuring the environment of a vehicle. User information 12 and parameters 14 can be accessed via electrical contacts 16 on the personality module 10. Certain types of memories, such as an atomic resolution storage memory, can store a large amount of information on a relatively small memory and thus may be used to store the information required for configuring a vehicle on an easily transported medium.

Figure 2:
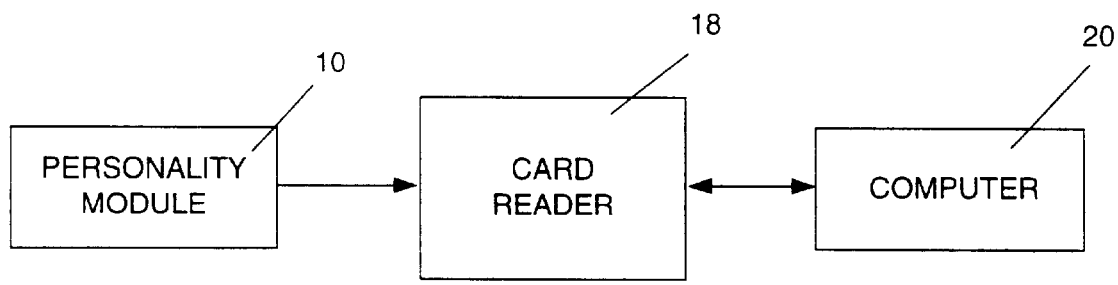
FIG. 2 is a diagram of a system for programing a personality module.

FIG. 2 is a diagram of an exemplary system for programming personality module 10. In particular, personality module 10 may be inserted into a card reader 18, and computer 20 can be used to transmit information to card reader 18 to be written to and stored within personality module 10. The programming device can be a stand-alone computer or a system on a vehicle in which a user can adjust all the desired parameters and then save the configuration on the storage medium. A user or other person may enter the user information into computer 20, which may then generate the parameters necessary to configure a vehicle according to the user information. The user information and parameters can then be downloaded to personality module 10 through card reader 18. Card reader 18 can be implemented with any device for writing information or reading information from personality module 10, such as a credit card-type reader for the personality module in a vehicle so equipped.

Figure 3:
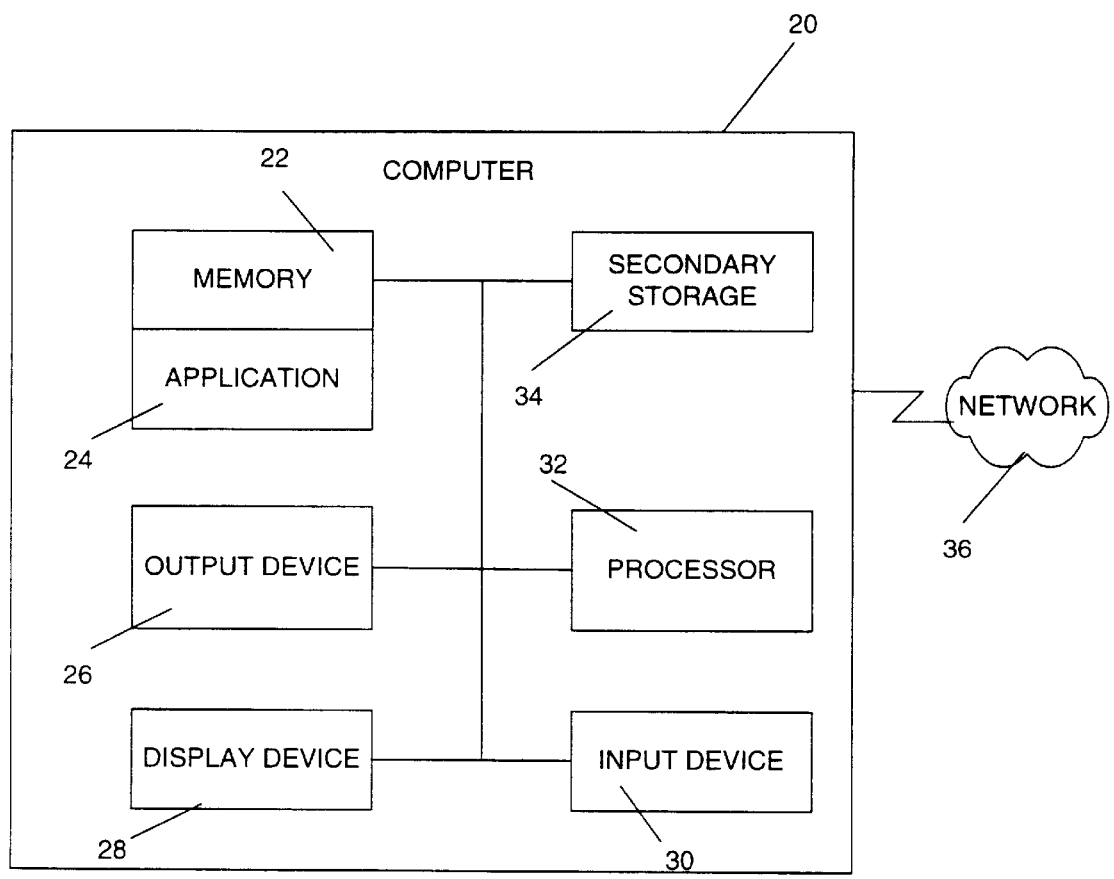
FIG. 3 is a diagram of exemplary computer for use in programming a personality module.

FIG. 3 is a diagram of exemplary computer 20. Computer 20 can include a connection with a network 36 such as the Internet. Computer 20 typically includes a memory 22, a secondary storage device 34, a processor 32, an input device 30, a display device 28, and an output device 26.

Memory 22 may include random access memory (RAM) or similar types of memory, and it may store one or more applications 24 for execution by processor 32. Applications 24 may correspond with software modules to perform processing for the functions described below. Secondary storage device 34 may include a hard disk drive, floppy disk drive, CD-ROM drive or other types of non-volatile data storage. Processor 32 may execute applications or programs stored in memory 22 or secondary storage 34, or received from the Internet or other network 36. Input device 30 may include any device for entering information into computer 20, such as a keyboard, key pad, cursor-control device, touch screen (possibly with a stylus), or microphone. Display device 28 may include any type of device for presenting a hard copy of information, such as a printer, and other types of output devices include speakers or any device for providing information in audio form. Computer 20 can possibly include multiple input devices, output devices, and display devices.

Although computer 20 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling computer 20 to perform a particular method. The computer can be recognized as a common form such as a personal computer, but can also be implemented with a computer embedded in a vehicle.

Figure 4:
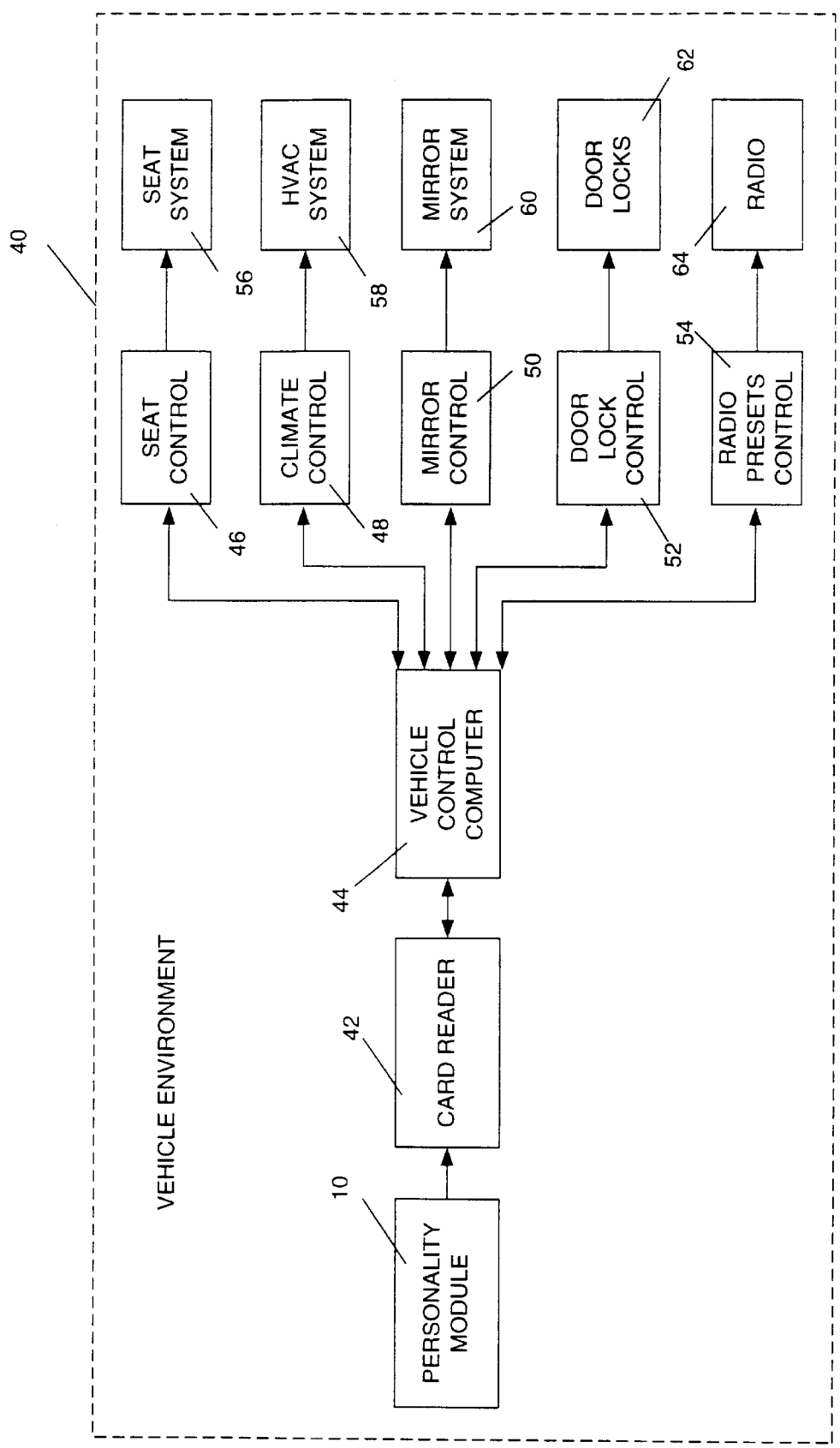
FIG. 4 is a diagram of a vehicle environment to be configured according to a personality module.

FIG. 4 is a diagram of a vehicle environment 40 to be configured using personality module 10. Vehicle environment 40 represents various environmental features of a vehicle to be configured according to a user's desired settings. The vehicle contains a card reader 42, similar to a card reader 18, connected with a vehicle control computer 44, which may have the same components as computer 20. Personality module 10 can be inserted into card reader 42, which can then retrieve and download the user information and parameters, and transmit them to vehicle control computer 44 for use in configuring environmental features of the vehicle. As described above, the computer on the vehicle can also be used to transfer the environmental parameters of interest to the user onto the personality module.

In particular, using the parameters, vehicle control computer 44 can access the following: a seat control module 46 configures a seat system 56; a climate control module 48 configures a heating, ventilation, and air conditioning system 58; a mirror control module 50 configures a mirror system 60; a door lock control module 52 configures door locks 62; and a radio preset control module 54 configures a radio 64. In addition, the personality module or card can contain information about the language most useful for audio-equipped vehicles to use with the user. Such vehicles can include audio-output systems, as known in the art, for providing information or warnings in audio form concerning operation of the vehicle or related information.

Seat control module 46 and mirror control module 50 include, for example, circuitry and mechanical apparatus for adjusting a position of a vehicle seat and vehicle mirrors. Climate control module 48 includes circuitry for controlling the heating, ventilation, and air controlling system in order to provide for a particular temperature within the interior of the vehicle. Door lock control module 52 includes circuitry for programming a combination for door locks within the vehicle doors. Radio presets control module 54 includes circuitry for defining radio station presets of a radio within the vehicle.

Figure 5:
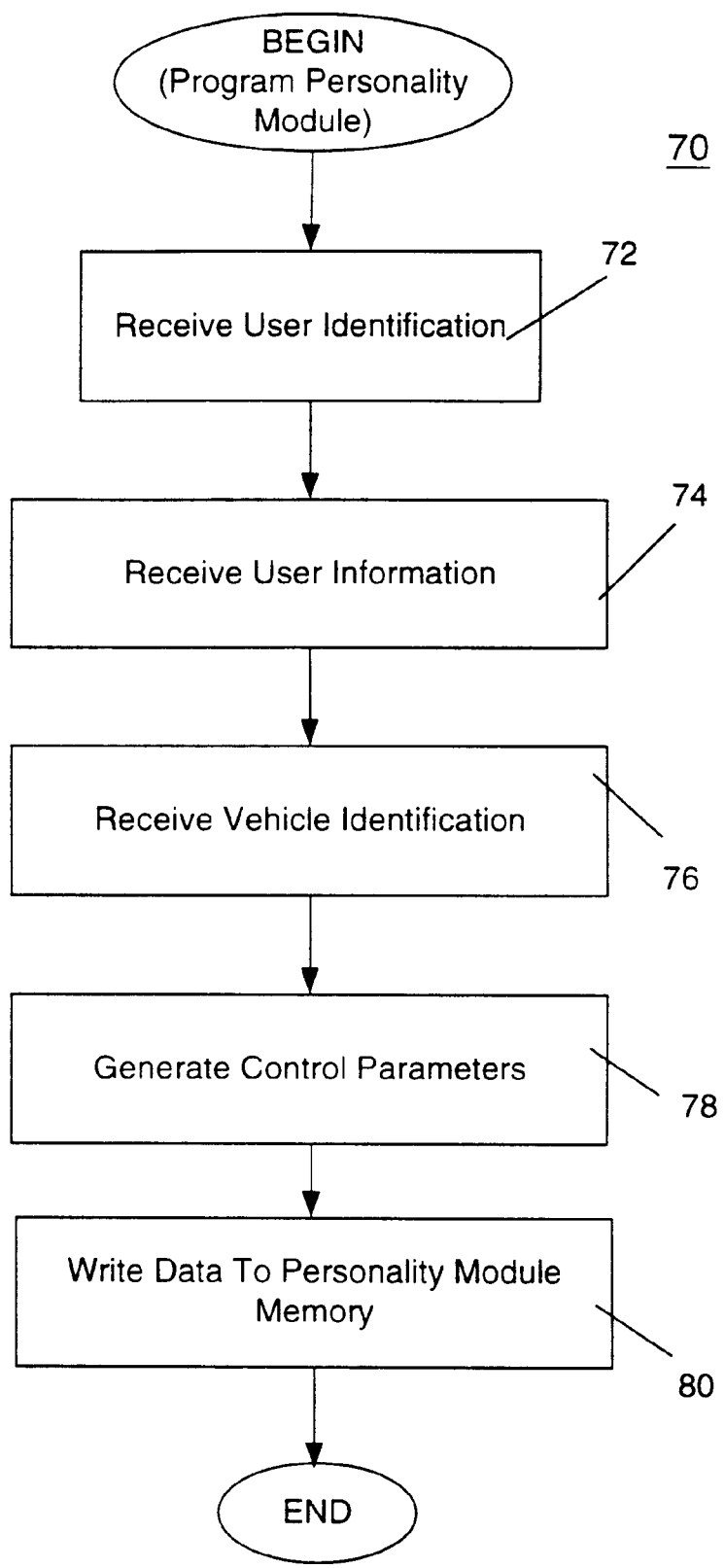
FIG. 5 is a flow chart of a method for programming a personality module.

FIG. 5 is a flow chart of a method 70 for programming personality module 10. Method 70 may be implemented in software modules executed by processor 32 in computer 20. Computer 20 receives a user identification (step 72) and user information (step 74). The user information can specify the users desired settings for configuring environmental features of a vehicle as illustrated in FIG. 4. Computer 20 can also receive a vehicle identification (step 76) if, for example, the particular type of vehicle must be known for generating parameters to configure the vehicle. Typically the vehicle itself will perform the conversion of the user's parameters to the specific implementation of the personality parameters on the vehicle, but should there be, for example, some important information needed about target vehicles, then the personality module or card can also contain this information.

Computer 20 generates control parameters based upon the user information (step 78). The control parameters can include a translation of the user information in order to generate the control signals necessary to configure the vehicle according to the user information. These control signals are the signals to be transmitted to the control modules as illustrated in FIG. 4. Computer 20 then writes the data to the personality module memory using card reader 18 (step 80).

Figure 6:
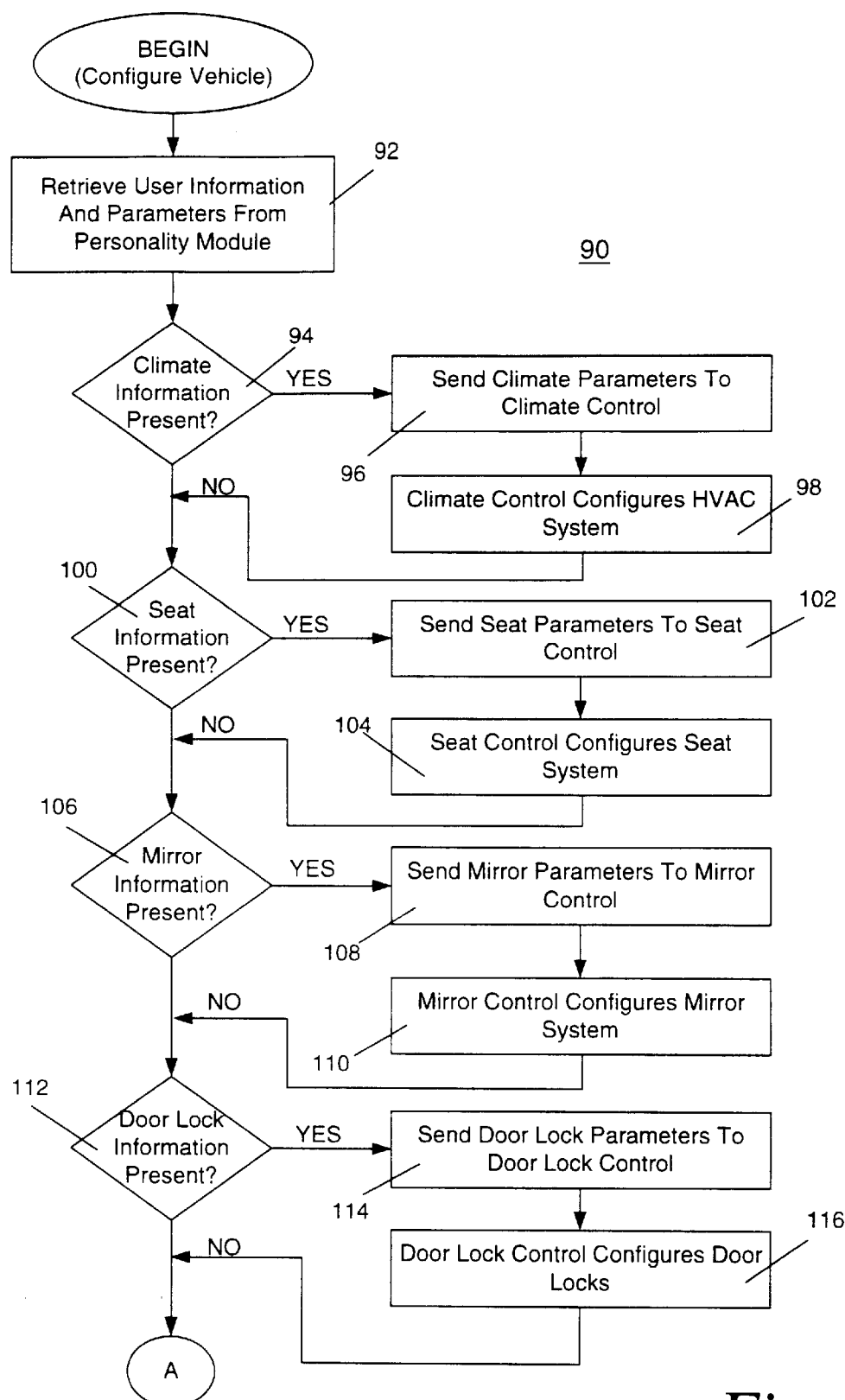
FIGS. 6 and 7 are a flow chart of a method for configuring a vehicle using a personality module.
Figure 7:
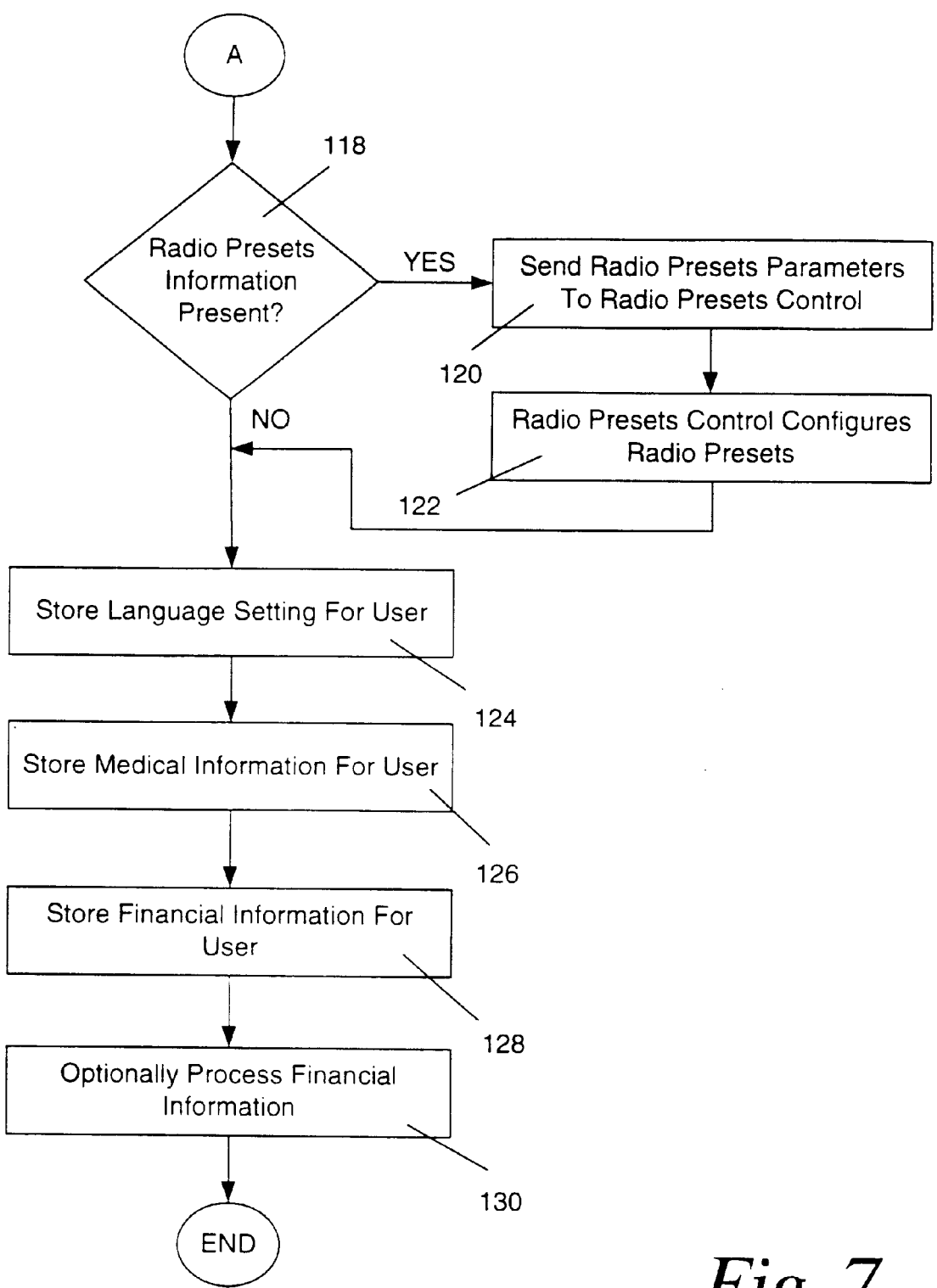

FIGS. 6 and 7 are a flow chart of a method 90 for configuring a vehicle according to the user information within personality module 10. Method 90 may be implemented in software modules and executed by vehicle control computer 44. In method 90, vehicle control computer 44 retrieves user information and associated parameters from personality module 10 through card reader 42 (step 92). Vehicle control computer 44 determines if climate information is present in the information (step 94); if so, it sends the climate parameters to climate control module 48 (step 96), which configures the heating, ventilation, air conditioning system 58 according to the parameters (step 98). Vehicle control computer 44 determines if seat information is present in the user information (step 100); if so, it sends the seat parameters to seat control module 46 (step 102), which configures seat system 56 according to the parameters (step 104). Vehicle control computer 44 determines if mirror information is present in the user information (step 106); if so, it sends the mirror parameters to mirror control module 50 (step 108), which configures mirror system 60 according to the parameters (step 110). Vehicle control computer 44 determines if door lock information is present in the user information (step 112); if so, it sends the door lock parameters to door lock control module 52 (step 114), which configures the door locks 60 according to the parameters (step 116). Vehicle control computer 44 determines if radio presets information is present in the user information (step 118); if so, it sends the radio presets parameters to the radio presets control module 54 (step 120), which configures the radio 64 according to the presets (step 122). The personality module can also contain language information for those vehicles which use audio-output systems, such as audible warning systems or information systems, and store the desired language setting for determining a language to select when providing the audible information (step 124).

In addition to user information specifying parameters, personality module 10 may also store other information related to the user. In particular, vehicle control computer 44 can download medical information for the user from personality module 10 (step 126). This medical information can be used to notify the nearest medical facility of the user's need for assistance in the case of an accident as indicated, for example, by the deployment of an air bag. Computer 44 can also download and store financial information such as a credit card number and related information (step 128). If the vehicle is a rental car, for example, the financial information can be used to charge the user for use of the vehicle. Therefore, vehicle control computer 44 can optionally process the financial information (step 130).

While the present invention has been described in connection with an exemplary embodiment, it will be understood that many modifications will be readily apparent to those skilled in the art, and this application is intended to cover any adaptations or variations thereof. For example, different software processing may be used without departing from the scope of the invention. This invention should be limited only by the claims and equivalents thereof.

What is claimed is:

1. A personality module for use in providing information concerning desired settings for a vehicle, comprising:

a transportable computer-readable medium specifying an identification of a user and specifying information for use in automatically establishing settings for at least one vehicle and specific to the user, the medium further specifying parameters related to the information and for use in generating control signals to automatically configure the vehicle according to the settings, wherein the medium is transportable from the vehicle to at least one additional vehicle for use in configuring the additional vehicle according to the settings specific to the user.

2. The personality module of claim 1 wherein the medium specifies information relating to a seat configuration for the user and parameters for use in generating control signals to automatically position a seat in the vehicle according to the seat configuration.

3. The personality module of claim 1 wherein the medium specifies information relating to a climate configuration for the vehicle and parameters for use in generating control signals to establish the climate configuration.

4. The personality module of claim 1 wherein the medium specifies medical information relating to the user.

5. The personality module of claim 1 wherein the medium specifies financial information relating to the user for services relating to use of the vehicle.

6. The personality module of claim 1 wherein the medium specifies information relating to a mirror configuration for the user and parameters for use in generating control signals to automatically position a mirror of the vehicle according to the seat configuration.

7. The personality module of claim 1 wherein the medium specifies information relating to radio station presets for the user and parameters for use in generating control signals to automatically establish the radio station presets in the vehicle.

8. The personality module of claim 1 wherein the medium specifies information relating to a language desired by the user for vehicles with audio-output systems.

9. The personality module of claim 1 wherein the medium specifies information relating to a door lock setting for the user and parameters for use in generating control signals to automatically establish the door lock setting for the vehicle.

10. The personality module of claim 1 wherein the computer-readable medium is contained within card having connections for use in transferring the parameters to the vehicle through use of an associated card reader.

11. A method for providing information concerning desired settings for a vehicle, comprising:

specifying on a transportable computer-readable medium an identification of a user;

specifying information on the medium for use in automatically establishing settings for at least one vehicle and specific to the user; and specifying parameters on the medium related to the information and for use in generating control signals to automatically configure the vehicle according to the settings, wherein the medium is transportable from the vehicle to at least one additional vehicle for use in configuring the additional vehicle according to the settings specific to the user.

12. The method of claim 11 wherein:

the specifying information step includes specifying information relating to a seat configuration for the user; and the specifying parameters step includes specifying parameters for use in generating control signals to automatically position a seat in the vehicle according to the seat configuration.

13. The method of claim 11 wherein:

the specifying information step includes specifying information relating to a climate configuration for the vehicle; and the specifying parameters step includes specifying parameters for use in generating control signals to establish the climate configuration.

14. The method of claim 11 wherein the specifying information step includes specifying medical information relating to the user.

15. The method of claim 11 wherein the specifying information step includes specifying financial information relating to the user for services relating to use of the vehicle.

16. The method of claim 11 wherein:

the specifying information step includes specifying information relating to a mirror configuration for the user; and the specifying parameters step includes specifying parameters for use in generating control signals to automatically position a mirror of the vehicle according to the seat configuration.

17. The method of claim 11 wherein:

the specifying information step includes specifying information relating to radio station presets for the user; and the specifying parameters step includes specifying parameters for use in generating control signals to automatically establish the radio station presets in the vehicle.

18. The method of claim 11 wherein:

the specifying information step includes specifying information relating to a door lock setting for the user; and the specifying parameters step includes specifying parameters for use in generating control signals to automatically establish the door lock setting for the vehicle.

19. The method of claim 11 wherein the specifying information step includes specifying information relating to a language desired by the user for vehicles with audio-output systems.

20. The method of claim 11, further including configuring the computer-readable medium within card having connections for use in transferring the parameters to the vehicle through use of an associated card reader.

* * * * *